(12) United States Patent
Snover et al.

(10) Patent No.: US 11,779,044 B2
(45) Date of Patent: Oct. 10, 2023

(54) 3D PRINTER

(71) Applicant: Rem3dy Health Limited, Birmingham (GB)

(72) Inventors: Melissa Snover, Birmingham (GB); Martyn Catchpole, Birmingham (GB)

(73) Assignee: REM3DY HEALTH LIMITED, Birmingham (GB)

( * ) Notice: Subject to any disclaimer, the term of this patent is extended or adjusted under 35 U.S.C. 154(b) by 240 days.

(21) Appl. No.: 17/210,412

(22) Filed: Mar. 23, 2021

(65) Prior Publication Data

US 2021/0298343 A1   Sep. 30, 2021

(30) Foreign Application Priority Data

Mar. 24, 2020 (GB) ...................................... 2004240

(51) Int. Cl.
| | | |
|---|---|---|
| *B33Y 30/00* | (2015.01) | |
| *A23P 20/20* | (2016.01) | |
| *A23P 30/20* | (2016.01) | |
| *B33Y 10/00* | (2015.01) | |

(52) U.S. Cl.
CPC ............... *A23P 20/20* (2016.08); *A23P 30/20* (2016.08); *B33Y 10/00* (2014.12); *B33Y 30/00* (2014.12)

(58) Field of Classification Search
None
See application file for complete search history.

(56) References Cited

U.S. PATENT DOCUMENTS

| | | | |
|---|---|---|---|
| 2010/0166969 A1* | 7/2010 | Batchelder ............ | B29C 64/106 427/402 |
| 2016/0214321 A1* | 7/2016 | Tow ....................... | B29C 64/25 |
| 2017/0325932 A1* | 11/2017 | Hoelzle ................. | B29C 64/118 |
| 2018/0099457 A1* | 4/2018 | Gifford ................. | B33Y 30/00 |
| 2019/0134905 A1* | 5/2019 | Mire ...................... | B33Y 40/00 |
| 2020/0123485 A1* | 4/2020 | Tamayol ............... | C12M 33/00 |
| 2020/0130277 A1* | 4/2020 | Thorpe ................. | B29C 64/209 |
| 2022/0258419 A1* | 8/2022 | You ....................... | B29C 64/295 |

* cited by examiner

*Primary Examiner* — Yung-Sheng M Tsui
(74) *Attorney, Agent, or Firm* — One LLP

(57) ABSTRACT

A 3D printer for producing consumable products, the 3D printer comprising an apparatus for dispensing a material, the apparatus comprising: a first syringe having a body for containing a material, a nozzle for dispensing the material from the body, and a plunger for controlling a pressure in the body, a plunger mechanism coupled to the plunger, a body mechanism coupled to the body and an actuator arranged to move the plunger mechanism relative to the body mechanism in a first direction to increase a pressure in the syringe body to dispense the material and to move the plunger mechanism relative to the body mechanism in a second direction to reduce the pressure in the syringe body to inhibit the dispensation of the material.

17 Claims, 12 Drawing Sheets

3D PRINTER

CROSS-REFERENCE TO RELATED APPLICATIONS

This application claims priority to United Kingdom Patent Application No. GB 2004240.4, filed Mar. 24, 2020, which is hereby incorporated by reference in its entirety for all purposes.

BACKGROUND

Machines exist for dispensing pharmaceutical products. However, existing machines produce volumes of identical products and rely on dispensing agents, such as pharmacists, to arrange pharmaceutical products for individual consumers. A device for reducing the burden placed upon dispensing agents is therefore desirable.

SUMMARY

In accordance with a first aspect of the present invention, there is provided a 3D printer for producing consumable products, the 3D printer comprising an apparatus for dispensing a material, the apparatus comprising: a first syringe having a body for containing a material, a nozzle for dispensing the material from the body, and a plunger for controlling a pressure in the body, a plunger mechanism coupled to the plunger, a body mechanism coupled to the body and an actuator arranged to move the plunger mechanism relative to the body mechanism in a first direction to increase a pressure in the syringe body to dispense the material and to move the plunger mechanism relative to the body mechanism in a second direction to reduce the pressure in the syringe body to inhibit the dispensation of the material.

Thus, the 3D printer according to the first aspect of the invention is arranged to print consumable items such as pharmaceutical or healthcare supplements. The reduction in pressure in the syringe body, such as to create a negative pressure, which may be only temporary, can reduce unwanted dispensation of the material from the syringe nozzle between printing operations and thereby can enable more accurate printing with less wastage.

A 3D printer according to embodiments of the invention therefore enables a fast-setting material to be dispensed in a controlled fashion such that a shape of the produced consumable item can be controlled, while enabling multi-layer consumable items to be produced quickly and consistently. In contrast to a machine which simply dispenses a dose a flowable material in a globule, the 3D printer according to embodiments of the invention can arrange the same volume of material into a shape which has greater surface area in comparison to a globule, enabling the flowable material to set more quickly in readiness for a subsequent layer to be dispensed on top of it. The increased surface area can also help an applied layer to adhere to an underlying layer.

The 3D printer can further comprise a plate containing a first print location for receiving and supporting material distributed from the first syringe, which may be rotatable relative to the syringe. This can allow material to be deposited by the syringe and then the print location can be moved for deposition via a second syringe to occur.

The plunger mechanism may be releasably coupled to the plunger and/or the body may be releasably coupled to the body mechanism. This may allow the 3D printer to be reused more efficiently for depositing different materials from different syringes.

The body mechanism may comprise an electromagnet, which may be turned on and off in order to allow decoupling of the body from the body mechanism. The body may comprise a flange arranged to be received in the body mechanism.

The syringe may comprise a handle coupled to the plunger and the plunger mechanism can comprise a flat plate arranged to exert a force on the syringe handle in a direction toward the syringe body. This can provide an arrangement for exerting a force on the syringe handle evenly and, if there are a plurality of syringes, then the plate may evenly move all of the syringe handles to provide even material distribution.

The plunger mechanism can comprise a retaining plate having a slot for receiving and retaining the syringe handle. This can allow the syringe to be easily installed in and securely retained by the retaining mechanism.

The plunger mechanism can further comprise a snap fit coupling for coupling the plunger of the syringe to the retaining mechanism. This can provide a simple means for installing the syringes in the retaining mechanism.

The plunger mechanism may comprise a lead screw. This can allow the retaining mechanism, and thereby the syringe handles, to be precisely controlled, for example using a stepper motor, optionally a geared stepper motor.

The 3D printer can further comprise a second syringe having a body for containing a second material, a nozzle for dispensing the second material and a plunger for controlling a pressure on the second material in the body, wherein the plunger mechanism is coupled to the plunger of the second syringe and the body mechanism is coupled to the body of the second syringe such that the pressure in the second syringe body varies with the pressure in the first syringe body. This can allow a plurality of different materials to be dispensed from the syringes and the use of a common retaining mechanism may allow uniform volumes of the material to be deposited and also allow more simple control of the syringes.

The first and second syringes may each comprise handles and the retaining mechanism can comprise at least two retaining plates, each retaining plate having a slot for receiving and retaining a syringe handle. With such an arrangement, there is provided a simple retaining means for resiliently retaining a plurality of syringes. Each syringe may be retained at an end of a slot.

The first and the second syringes can be arranged to dispense different materials onto a first and a second print location respectively. Thus, the flowable material in the first body can be different to the flowable material in the second body. This can allow a range of products to be created where each product comprises more than one material in a shorter time.

The plate can be rotatable so that the first syringe may align with the second print location at a point in time and the second syringe can align with the first print location at a point in time. This can result in a more efficient printing process for producing a product having a plurality of different materials.

The apparatus can comprise a controller arranged to deposit the flowable material from the syringe nozzle onto a first print location by moving the plunger of the syringe with the plunger mechanism in a first direction to increase a pressure in the syringe body, move the plunger of the syringe in a second direction opposite to the first direction with the plunger mechanism in order to reduce a pressure in the syringe body and prevent deposition.

The first and second print locations can be within a print zone, which can comprise a plate and a rotation device can be mechanically coupled to the plate to rotate the plate about a Z axis. Thus, the rotation device can be arranged to rotate the part of a print bed upon which a print head comprising the syringes is arranged to print. This can be advantageous in that the print zone plate can be significantly lighter than the liquid dispensers and the portion of the print head which carries them, meaning that smaller, cheaper motors and the like can be utilised, bringing energy and heat efficiencies. It can also allow more accurate rotation and alignment of the print bed.

The translation device can be arranged to move the print bed relative to the print head along the Z axis. This enables the distance between the tips of the dispenser nozzles and the print locations on the print bed to be increased as layers of the consumable items are added, enabling the nozzles to be continually close to the top surface of a consumable item as it is built up.

Each syringe can be arranged to be mounted in or on the print head, the print head being arranged to support the plurality of syringes. This enables ubiquitous syringes such as food or medicine grade stainless steel syringes to be used for the printing process.

The print head can comprise: a block having a plurality of block apertures extending through the block; and a syringe support arranged to receive and hold the syringes to define the regular polygon, the syringe support being removably coupled to the block. The block may be part of the body mechanism.

The block can comprise heating means operable to heat the material in the syringes. The heat block can be used to heat the material in the dispensers to aid in it being extruded by the actuator device during the dispensing cycles. The block can have a thickness in the Z axis which encompasses at least half of the length of the body of the syringes to provide a large region of thermal coupling. The heating means can comprise resistive electrical wiring or hot water conduits embedded in a metal block.

The syringe support, which may be part of the body mechanism, can comprise: a first support plate having a plurality of support apertures, each support aperture being arranged to receive a syringe and being sized such at least some of the body of the syringe can pass through the support aperture but a radially enlarged flange of the syringe body cannot pass through the support aperture; a second support plate having a plurality of support apertures, each support aperture being arranged to receive a syringe and being sized such at least some of the body of the syringe can pass through the support aperture but a radially enlarged flange of the syringe body cannot pass through the support aperture, the support apertures being arranged to define the regular polygon; and coupling formations arranged to enable the first support plate to be coupled to the block with the second support plate being situated between the block and the first support plate. This provides a device via which a plurality of syringes can be quickly and conveniently coupled together in the regular polygon configuration, ready for inserting into the print head.

The coupling formations can comprise regions of ferromagnetic material and the block comprises a plurality of electromagnets situated to align with the coupling regions when the syringe support is situated on the block and operable to magnetically couple the syringe support to the block. The coupling formations can comprise discs which extend from a lower face of the first plate by a distance which places the free axial faces of the discs in registration with the lower surface of the second plate when the plates are pressed together with the syringe flanges between them.

The flat plate can have a drive face with plurality of syringe handle locations arranged in a regular polygon and a pair of parallel support rails defining a channel between them and having flanged sections spaced from the first plate and extending towards one another, the plurality of syringe handle locations being defined between the support rails; first and second retaining plates, each retaining plate including a plurality of slots that extend into the retaining plate from a first edge and have arcuate end faces which, when the first and second retention plates are inserted into opposite end of the channel, with the syringe plungers located at the syringe plunger locations, overlap the syringe plungers to grasp the syringe plungers. One or more linear actuators can be coupled between the flat plate and the block to linearly move the flat plate towards the block to dispense liquid from the syringes. This provides a device via which a plurality of syringes located in a syringe support can be quickly and conveniently coupled to the print head.

The print bed can comprise a plurality of print zones. Thus, the translation device can be utilised to move the print bed along the X axis once a first set of consumable items have been printed at the first print zone and the process can be repeated to print one or more further sets of consumable items at one or more further print zones on the print bed. This can enable a greater number of consumable items to be printed in a fast manner without increasing the size, weight and/or complexity of the print head.

The print head can be arranged to position the nozzles to define a seven sided polygon and each print zone positions the print locations to define a seven sided polygon. The print bed can consist of four print zones disposed in a linear arrangement along the print bed, with the axis of each print zone intersecting a longitudinal axis of the print bed. This can provide an arrangement particularly well suited to printing pharmaceutical or healthcare supplements.

The controller can be further configured to cause the 3D printer to perform the following steps: with the first Z axis aligned with the second Z axis, operate the actuator device to dispense liquid from each nozzle onto a respective print location: operate the rotation device to cause relative rotation between the print zone and the print head to place each print location in registration with a different one of the nozzles; and operate the actuator device to dispense liquid from each nozzle onto a respective print location. This process can be repeated a number of times, preferably by the same number as the number of dispensers such that a multi-layer consumable item can be printed having a component provided by each dispenser.

The controller can be further configured to cause the 3D printer to perform the following steps: move the print bed in the Z direction away from the print head following each step of operating the actuator device to dispense liquid from each liquid dispenser onto a respective print location by an amount which corresponds to the thickness in the Z axis of the liquid dispensed on the print locations.

The controller can be further configured to move the print bed in the X and Y directions while operating the actuator device to dispense liquid from each liquid dispenser onto a respective print location to define a closed loop shape.

The flowable material dispensers can be filled with any of the compositions disclosed in WO 2016113318 A1, WO 201121822 A1 or WO 2017/032689 A1. The dispensers can be filled with a fast-setting composition, optionally a fast-setting gel. This can allow faster rates of manufacture. The material can be a liquid.

In alternative embodiments, the apparatus can be a dispenser for manufacturing a consumable product and not necessarily a 3D printer.

In accordance with a second aspect of the present invention, there is provided a method for depositing material using a 3D printer, comprising: coupling a syringe to the 3D printer, the syringe having a body for containing material, a nozzle for dispensing the material and a plunger for controlling a pressure in the body, depositing the material from the syringe nozzle onto a first print location by moving the plunger of the syringe with a plunger mechanism in a first direction to increase a pressure in the syringe body, moving the plunger of the syringe in a second direction opposite to the first direction with the plunger mechanism in order to reduce the pressure in the syringe body and to inhibit deposition of the material.

With such a method, unwanted deposition of material from the syringe nozzle can be reduced. In particular, leakage or deposition during the moving of the print location can be reduced. Therefore, more accurate printing, resulting in a higher quality product and less wastage of material can be achieved.

The method can further comprise installing the syringe in a retaining mechanism by carrying out the following steps in order: applying a force to the syringe handle using a first plate of a retaining mechanism on a first side of the syringe handle; and installing a second plate of the retaining mechanism on a second side of the syringe handle opposite to the first side. This can allow a retaining mechanism to be used which has very low tolerances and therefore improve accuracy of control of the syringe handle, reducing lost motion.

The syringe can be a first syringe, and the method can further comprise: providing a second syringe having a body for containing a second material, a nozzle for dispensing fluid and a plunger for controlling a pressure in the body, depositing a material from the second syringe nozzle onto a second print location by moving the plunger of the second syringe with the retaining mechanism in the first direction to increase a pressure in the syringe body at the same time as the movement of the first syringe handle, moving the plunger of the second syringe in a direction opposite to the first direction in order to reduce the pressure in the second syringe body and to inhibit deposition of the material. This can allow a plurality of materials to be dispensed simultaneously from the syringes and thereby provide a simple and efficient production method for consumable products.

The method can further comprise depositing material from the first syringe nozzle onto a second print location by moving the handle of the first syringe in the first direction to generate a positive pressure in the syringe body. This can allow the production of a consumable product having more than one material.

The movement of the first print location can be due to rotation of a plate containing the first print location. This can allow greater precision of 3D printing as rotation can be carried out more precisely than linear movement. The rotation can also allow better utilisation of syringes.

BRIEF DESCRIPTION OF THE DRAWINGS

By way of example only, certain embodiments of the invention will now be described by reference to the accompanying drawings, in which.

DETAILED DESCRIPTION

Figure 1A:
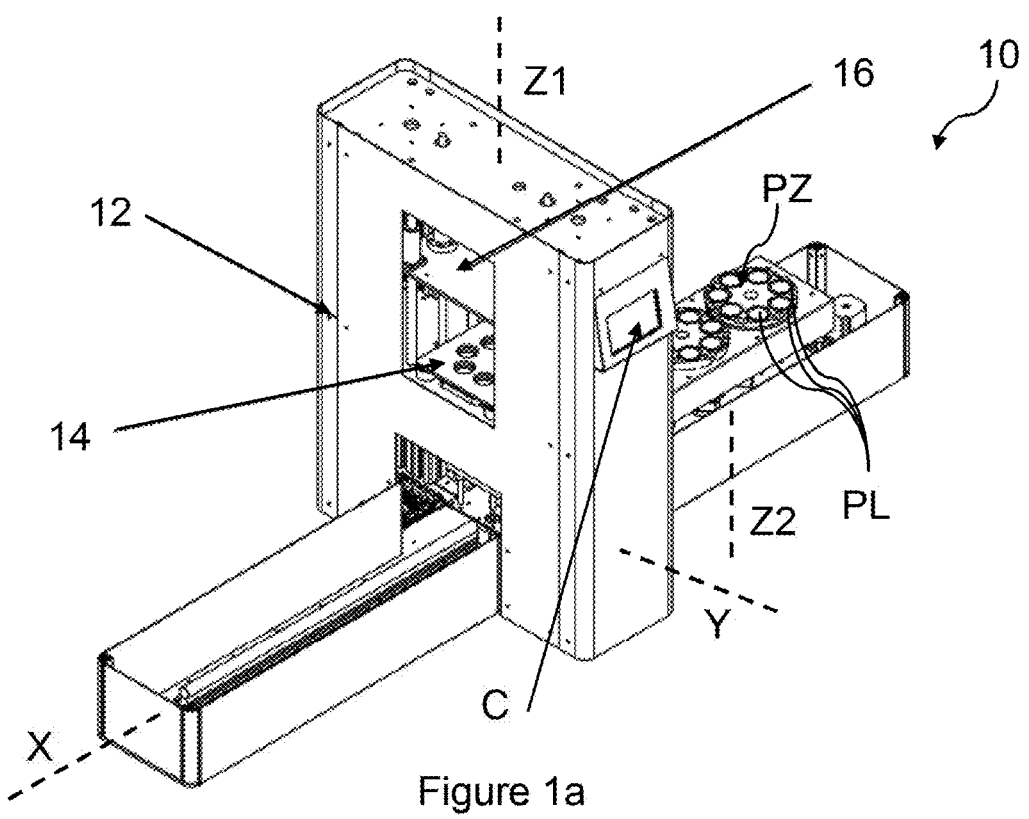
FIGS. 1a and 1b are perspective and side view diagrams of a 3D printer according to an embodiment of the invention.
Figure 1B:
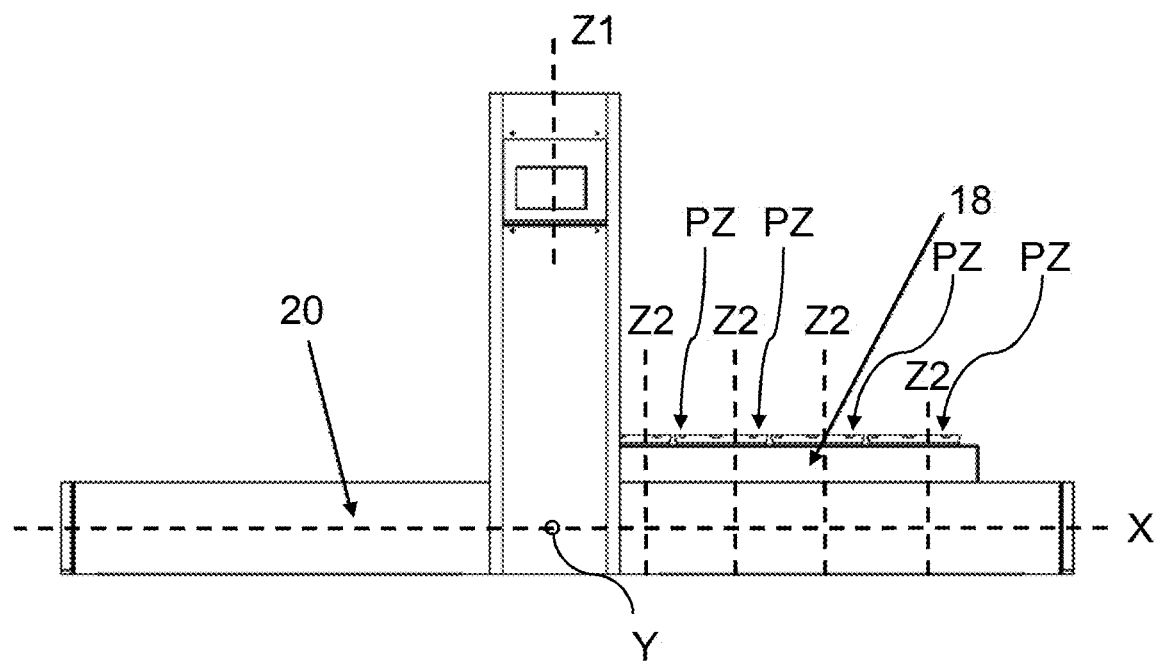

FIGS. 1a and 1b show a 3D printer for printing consumable items according to an embodiment of the invention generally at 10. A 3D printer is an apparatus arranged to dispense fast-setting material in a controlled fashion such that a shape of the produced product can be controlled.

The 3D printer 10 has a print head 12 arranged to position nozzles of a plurality of flowable material dispensers to define a regular polygon around a first Z axis Z1. In this embodiment the fluid dispensers are syringes arranged to be situated in a downward facing manner on a block 14 within the print head 12.

The 3D printer 10 has an actuator device 16, which in this embodiment is located within the print head 12, operable to dispense a portion of material from each material dispenser located within the block 14.

The 3D printer 10 has a print bed comprising four print zones PZ, each print zone PZ comprising a plurality of print locations PL arranged to define a regular polygon around a respective second Z axis Z2.

The 3D printer 10 has a translation device operable to move the print bed 18 relative to the print head 12 along X and Y axes. In this embodiment the print bed 18 is slidably mounted on a base 20 so as to be movable along the X axis.

As can be seen from FIGS. 1a and 1b, the first and second Z axes Z1, Z2 are vertical and may be offset and the X and Y axes are horizontal and may be perpendicular to each other.

The 3D printer 10 has a rotation device operable to cause relative rotation between the print zone PZ and the print head 12 such that, with the first Z axis Z1 aligned with the second Z axis Z2, the actuator device 16 is operable to dispense material from each material dispenser onto a respective print location PL and thereafter the rotation device is operable to cause relative rotation between the print zone PZ and the print head 12 to place each print location PL in registration with a different one of the nozzles.

Figure 2A:
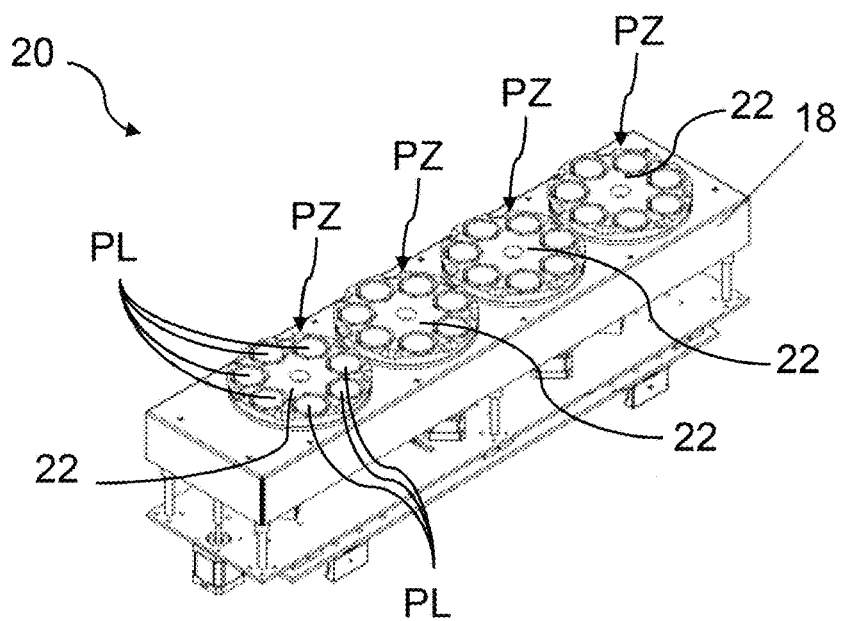
FIGS. 2a, 2b and 2c are perspective, top and side view diagrams respectively of a movable portion of the print bed of the 3D printer of FIG. 1.
Figure 2B:
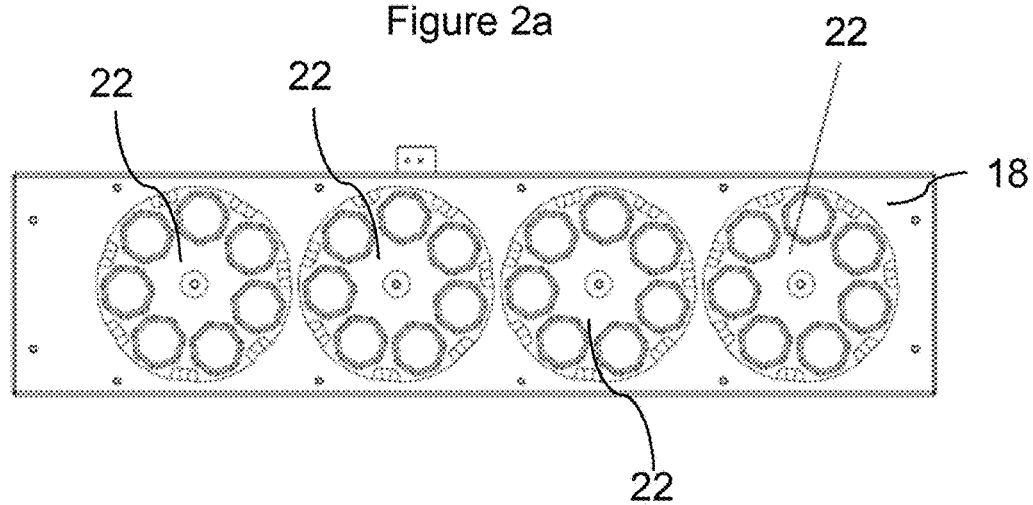
Figure 2C:
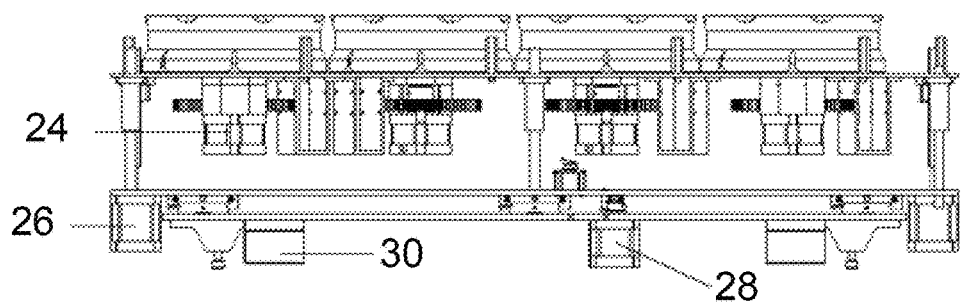

FIGS. 2a, 2b and 2c are perspective, top and side view diagrams respectively of the movable portion of the print bed 18 of the 3D printer of FIG. 1.

The print bed 18 is supported on a base 20, the base having an X motor (not shown) for moving the print bed 18 in the X direction by interaction with an X bearing 30. The print bed has a Z motor 26 for moving the print bed 18 in a vertical direction, i.e. along the second Z axis Z2 and a Y motor 28 for moving the print bed 18 along the Y axis.

The print bed 18 comprises plates 22, which form print zones PZ. In the disclosed embodiment, there are four plates 22 forming four respective print zones PZ, however other numbers of plates 22 and print zones PZ may be used. The print zones PZ may be located along a top surface of the print bed 18 and separated along the X axis.

The respective print zone PZ defined by each plate 22 has a plurality of print locations PL. The plates 22 may each be rotationally symmetrical about their respective second Z axis Z2 such that the plates 22 can be rotated and the print locations can change position such that a first print location PL may take the position of a second print location PL when the plate 22 is rotated by a predetermined number of degrees. The plates 22 can be rotated in order to move the print locations PL by rotation motors 24. The rotation motors 24 are preferably stepper motors, more preferably geared stepper motors which can provide a high degree of accuracy of rotation.

Additionally, there may be a one or more pins in the base 20 that engage corresponding orifices or bevels in the plates 22 when the correct rotation is reached. The pins may lock the plates 22 in position in order to prevent undesirable rotation of the plates 22 during deposition.

While FIGS. 2a and 2b show print zones PZ each having seven print locations PL, other numbers of print locations PL on each print zone are possible. The number of print locations PL in each print zone PZ should preferably be the same as the number of syringes supported within the print head 12.

Figure 3:
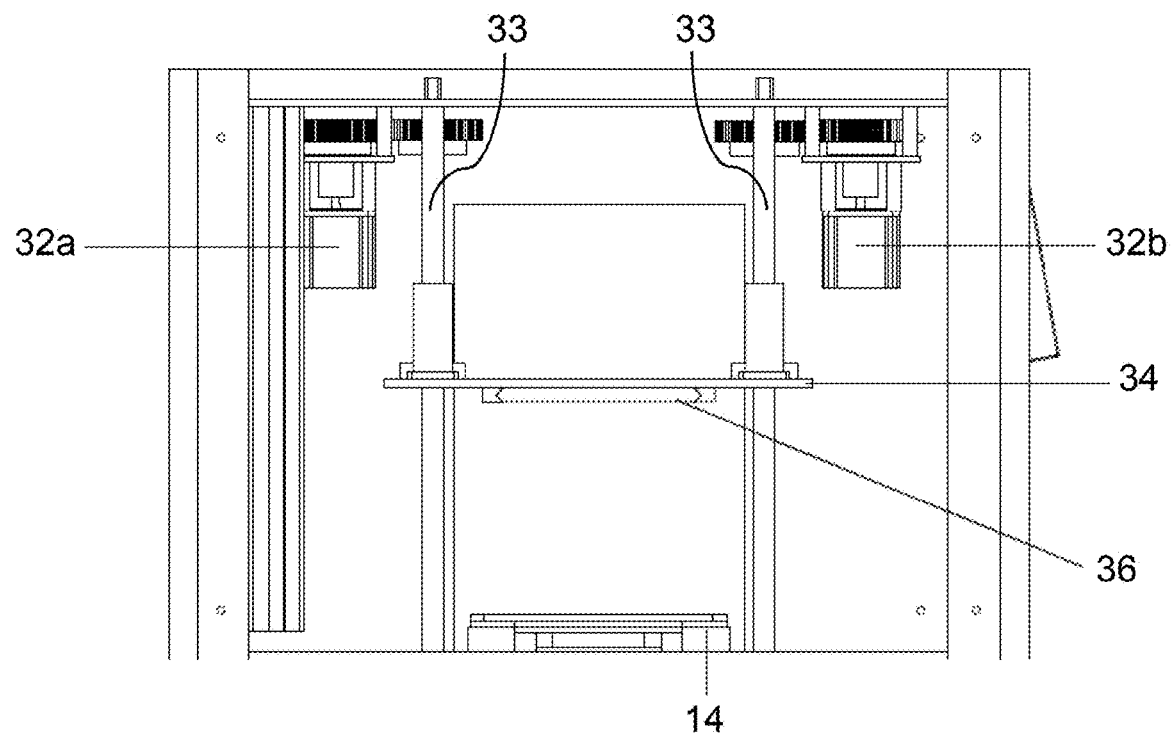
FIG. 3 is a side view diagram showing internal components of the print head of the 3D printer of FIG. 1.

FIG. 3 shows an extrusion system for operating syringes. The extrusion system comprises an extrusion plate 34 for pressing on the plungers of syringes and a retaining plate 36 for securing the handles of syringes. The extrusion plate 34 and the retaining plate 36 are moveable in a vertical direction along rails 33, which define a channel therebetween. These parts thereby form a plunger mechanism for moving the plungers of the syringes. Extrusion motors 32a and 32b are arranged to drive the extrusion plate 34 and retaining plate 36 vertically in order to exert a downward force on the plungers of the syringes such that material is dispensed from the syringes.

The system may also comprise a heater block 14, which may contain an electrical wire or fluid circulation system and is arranged to heat material within the syringes in order to reduce the viscosity of the material and/or melt the material in order that the material can be more easily dispensed from the syringes and a greater range of materials may be dispensed by using a heater block 14.

Figures 4A, 4B:
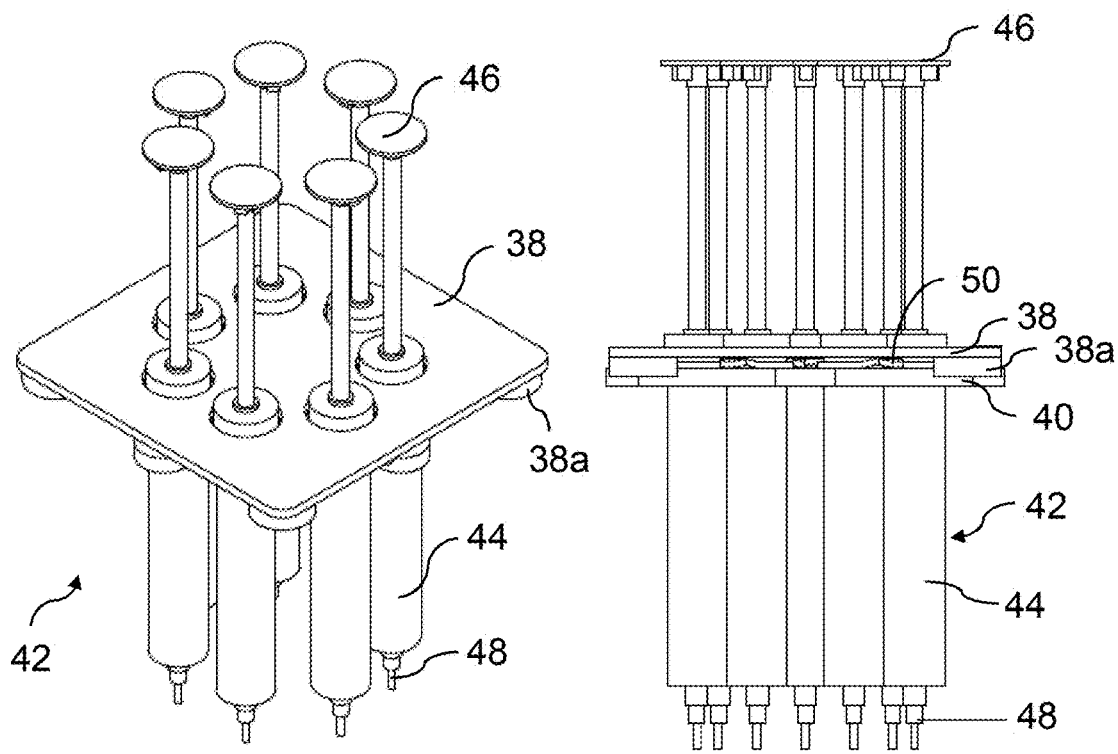
FIGS. 4a and 4b are perspective and side view diagrams respectively of syringes held in a syringe support of the 3D printer of FIG. 1.

FIGS. 4a and 4b show an arrangement of syringes 42 in a body mechanism, but embodiments extend to apparatus comprising a single syringe. Each syringe has a syringe body 44, which may be filled with an esculent material to be dispensed, a nozzle 48 for controlling dispensation of the material, and a plunger 46, which can be pressed towards the syringe body 44 in order to extrude material from the nozzle 48. Each syringe may also have a lug 50 extending from the syringe body 44. The lug 50 can be placed between two support plates 38, 40. There may be a first support plate 38 above the lug and a second support plate 40 below the lug. The first support plate 38 may have coupling formations 38a for holding the first support plate 38 to a block, such as heating block 14 of the print head 12 or a non-heated block.

The arrangement of the first and second support plates 38, 40 and the syringes 42 allows the syringes 42 to be held in a stable formation outside the print head 12 so that the syringes 42 can all be inserted quickly and easily at the same time into the print head 12.

Figure 5:
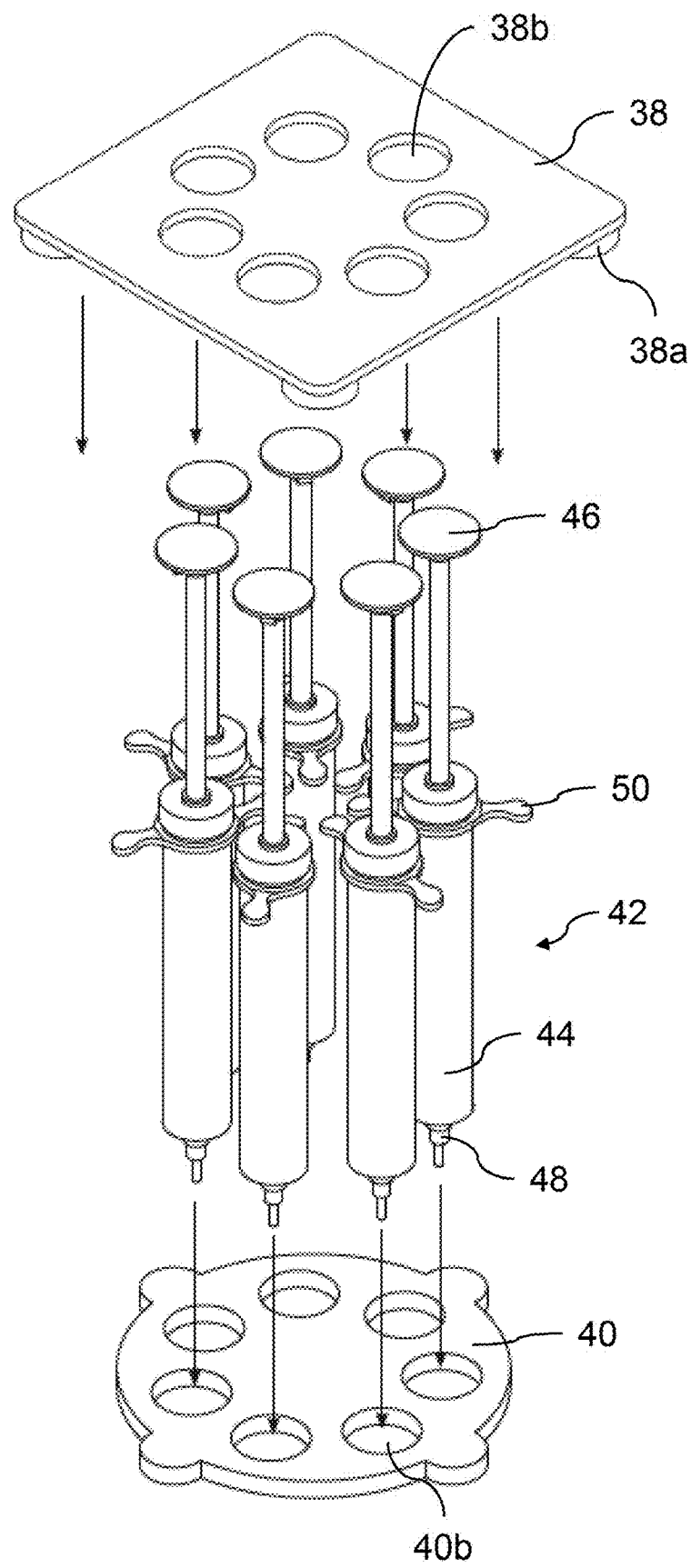
FIG. 5 is a diagram illustrating syringes being loaded into the syringe support of the 3D printer of FIG. 1.

As shown in FIG. 5, the first support plate 38 may have support apertures 38b sized to be larger than the syringe body 44 and smaller than the lugs 50 and the second support plate 40 may have second support apertures 40b, which may also be sized to be larger than the syringe body 44 and smaller than the lugs 50. This allows the syringes 42 to be inserted through the support apertures 38b, 40b and held in place by the lugs 50 and support plates 38, 40.

Figure 6:
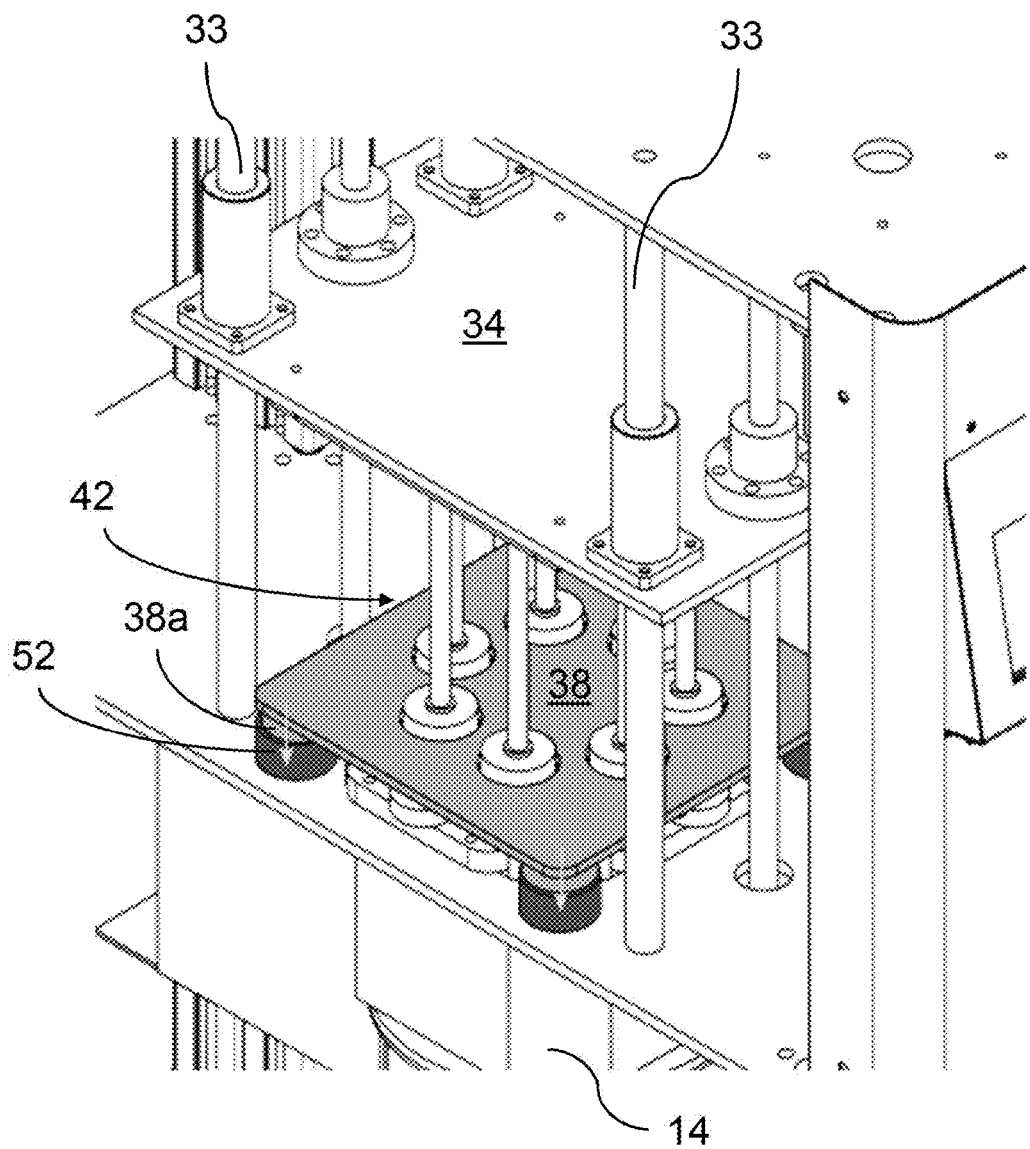
FIG. 6 is a diagram showing the syringe support mounted on the block of the print head of the 3D printer of FIG. 1.

FIG. 6 shows the print head 12 with the syringes 42 installed. The syringes 42 are installed within the heating block 14 and are held in place by the first support plate 38 and second support plate (not visible in FIG. 6). It can be seen that the coupling formations 38a are coupled to corresponding coupling formations 52 on the heating block 14. The coupling formations 38a on the first support plate 38 may be ferromagnetic materials and the corresponding coupling formations 52 on the heater block 14 may be magnets, preferably electromagnets. The plunger ends of the syringes 42 (not visible in FIG. 6) are situated under the extrusion plate 34, such that the extrusion plate 34 may move vertically downwards in order to extrude material from the syringes 42.

Figure 7:
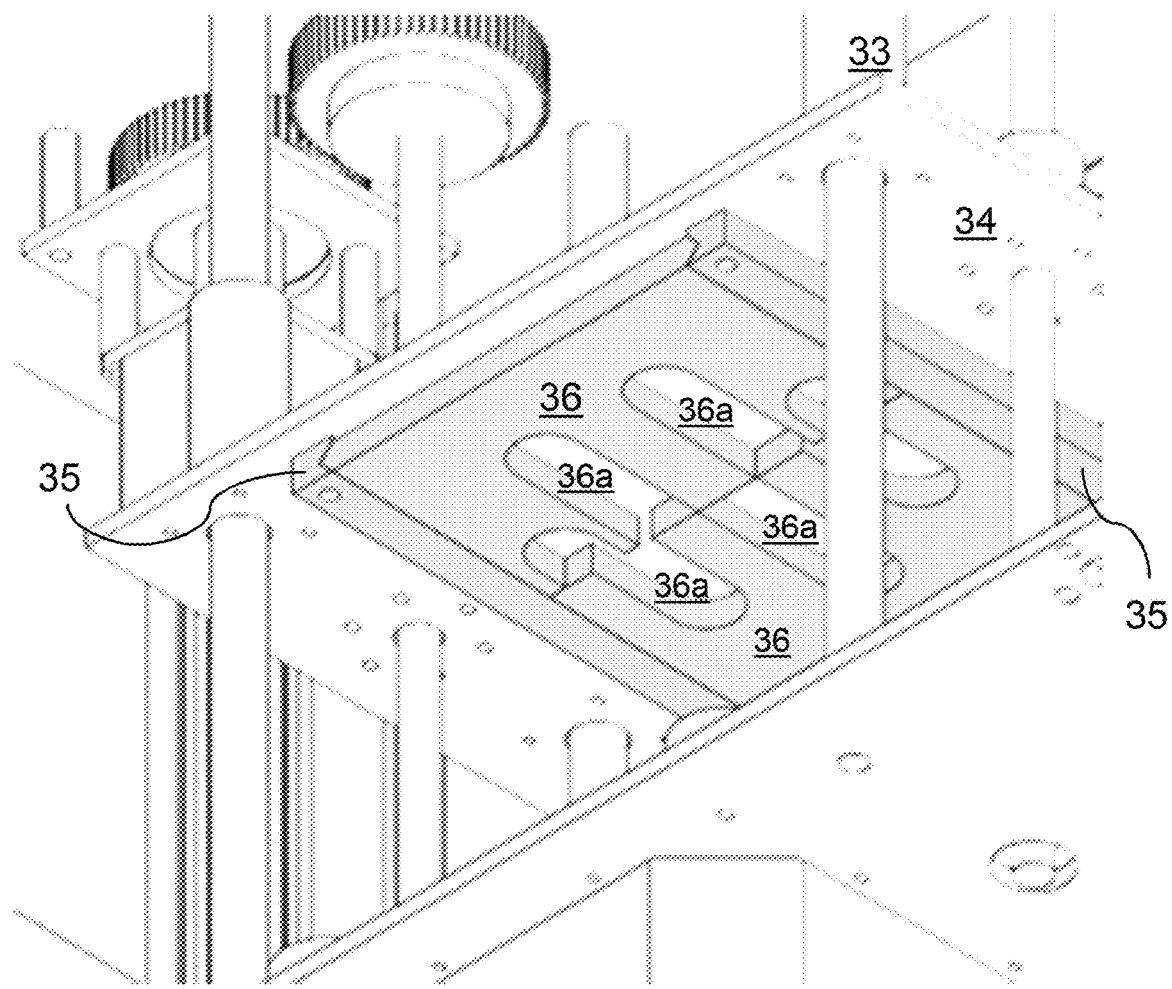
FIG. 7 is a perspective diagram of a lower side of the retaining mechanism of the actuator device of the 3D printer of FIG. 1.

FIG. 7 shows a view of the retaining plate 36 connected to the flat plate 34, which may also be referred to as an extrusion plate or a drive plate, from underneath. It can be seen that the retaining plate 36 may be formed as two parts, which may be slid into place along slide rails 35. The retaining plates 36 may comprise slots 36a which may be slid into place in order to hold the plungers 46 of the syringes 42.

Since the syringe handles 46, also referred to as syringe plungers, have a portion of greater width than the width of the slots 36a, the retaining plates 36 can exert a force on the syringe handles 46 in a direction away from the syringe bodies 44.

Figure 8:
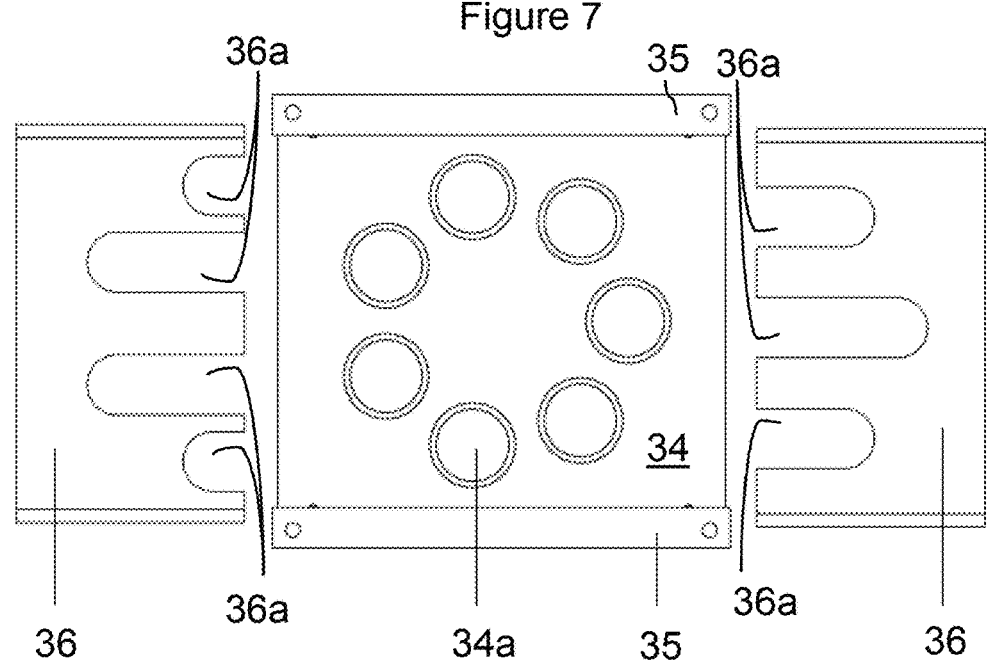
FIG. 8 is a lower view of part of the drive plate, showing plunger locations.
Figure 9:
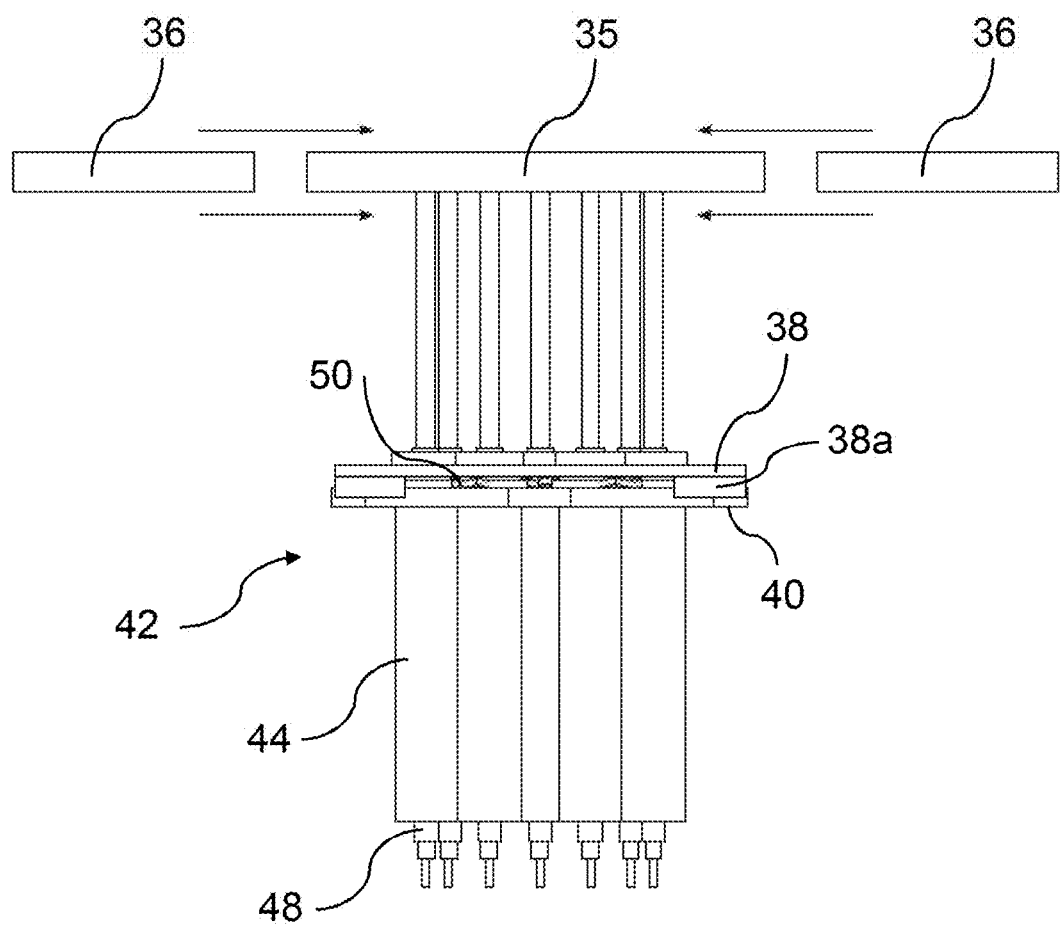
FIG. 9 is a side view diagram illustrating insertion of the retention plates.

FIGS. 8 and 9 show how the two parts of the retaining plate 36 may be slid into place.

The machine may be operated such that the extrusion plate 34 is operated to push down on the syringes 42 so that all plungers are touching the extruding plate 34 and the retaining plates 36 may be slid into place to grip onto the plungers 46 while the plungers 46 are all in contact with the extrusion plate 34. This can prevent the plungers 36 from moving away from the extrusion plate 34 and ensure stabilisation of the plungers 42. This can also allow a force to be exerted on the plungers 42 in a direction away from the syringe bodies 44 in order to create a negative pressure within the syringe bodies 44 and thereby to prevent extrusion of material.

The 3D printer may be operated so that a print zone PZ is positioned underneath the syringes 42, with the first Z axis Z1 collinear with the second Z axis Z2 and the print zone PZ underneath the nozzles 48. An amount of material may be extruded from the nozzles 48 of the syringes 42 onto the plurality of print locations PL underneath the syringes 42. Following the extrusion of material, the extrusion may be stopped, and the print location can be changed by rotating the plate 22 about the Z axis Z2. The rotation can occur such that after the rotation each print location PL is underneath a different syringe 42. Subsequently, a second extrusion step can take place, wherein further material is extruded from each syringe 42 onto a respective print location PL, with each print location PL having a different material from a different syringe 42 deposited onto it between each rotation step. This process can be repeated until every print location PL has all necessary material deposited upon it, such as after a complete rotation of the print zone PZ. Subsequently, the print bed 18 can be moved in the X direction such that a new print zone PZ and is positioned underneath the syringes 42.

It is also noted that certain syringes 42 of the arrangement may be absent or may be empty, if the number of different materials required to be deposited does not exactly match the number of print locations PL. Alternatively, more than one syringe 42 may contain the same material, it is not essential that every syringe 42 has a different material.

The syringes 42 may be sterile syringes suitable for use in food or pharmaceutical manufacture and may be filled with pharmaceutical or food compositions for manufacturing food or pharmaceutical supplements, including vitamin and mineral supplements. The flowable material in the syringes may be solid or may be a gel at room temperature, and may become liquid or a less viscous gel when heated by the heated block 14.

It is also possible to move the print bed 18 and therefore the print zone PZ and print location PL in the X and Y directions during the extrusion step in order to control the manner and precise location of deposition of material on each print location. This can allow creation of consumable products having specific shapes or patterns.

In between each extrusion step, the print bed 18 can be moved in the Z direction, for example in order to prevent deposited material from touching a syringe novel 48.

Figure 10B:
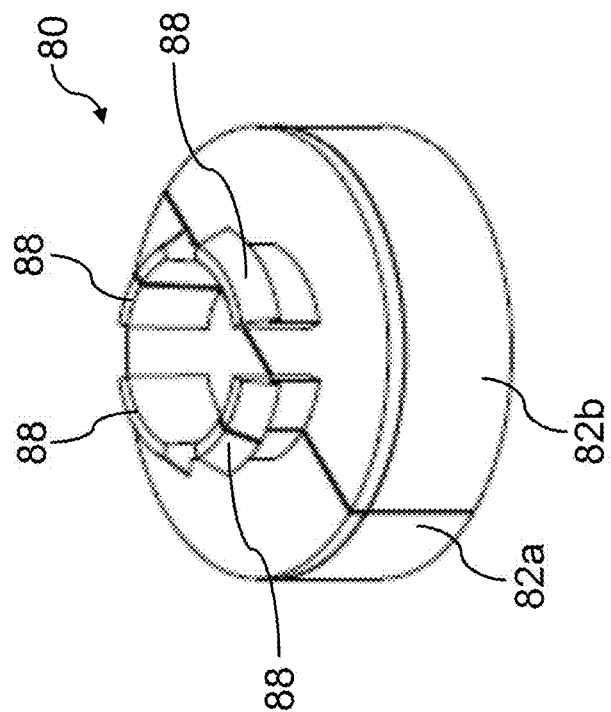
FIGS. 10a and 10b are perspective view of snap fit couplings for use with the 3D printer of the present invention.
Figure 10A:
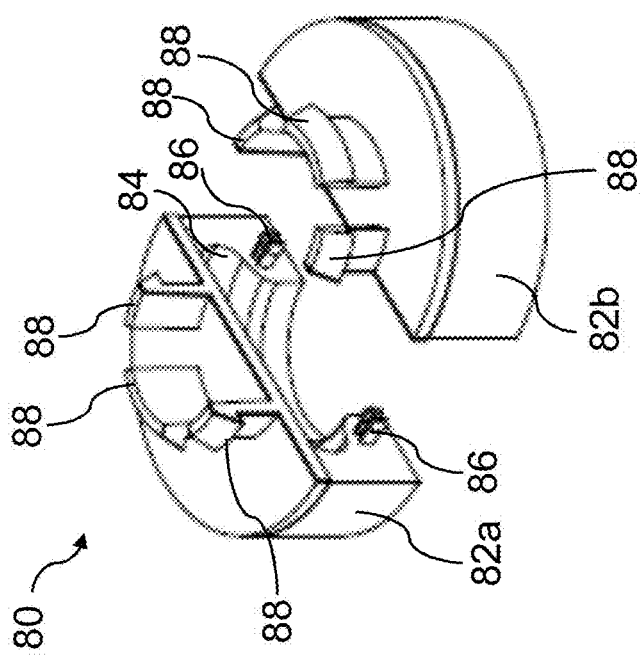

FIG. 10*a* shows a snap-fit connection 50 for connecting syringes to a retaining mechanism. The snap-fit connection 50 has two parts 52*a*, 52*b*. A first part 52*a* has one or more connectors 56, which may be snap fit connectors, and a second part 52*b* may have corresponding connectors or recesses for receiving the snap fit connectors. Alternatively, each of the two parts 52*a*, 52*b* may have a snap fit connector and each part 52*a*, 52*b* may have a recess corresponding to the snap-fit connector on the opposite part.

Both parts 52*a*, 52*b* contain a groove 54 for receiving a handle 46 of a syringe, the groove 54 may be shaped to grip the syringe handle. The connection 50 also has a hole on a bottom side for allowing the plunger of the syringe to extend away from the connection 50 toward the syringe body 44.

The snap-fit connection 50 has at least one protrusion 58 on a top surface, opposite the side having a hole. The protrusion is preferably flexible so that it can be connected into a retaining mechanism by insertion into a corresponding hole (not shown) of the retaining mechanism and resiliently held within the retaining mechanism.

FIG. 10*b* shows the snap fit connection 50 with both parts 52*a*, 52*b* joined.

Figure 11A:
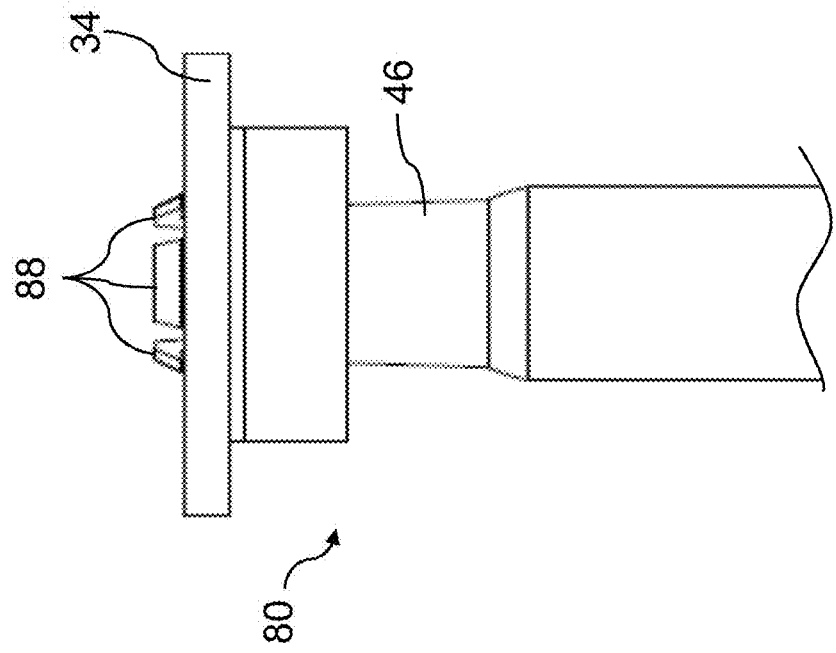
FIGS. 11a and 11b are diagrams showing how a syringe and snap fit may be installed within a 3D printer of the present invention.
Figure 11B:
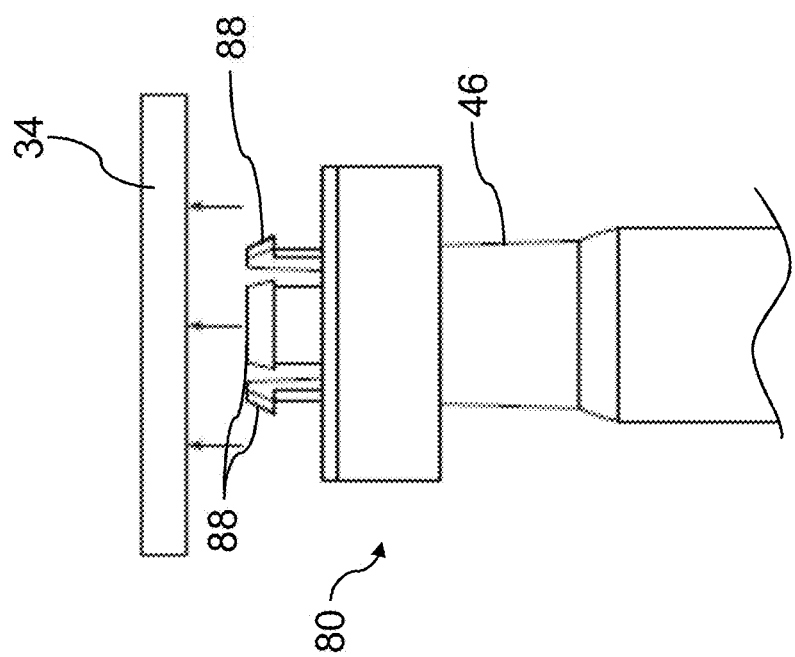

FIGS. 11*a* and 11*b* show how the snap-fit connection 50, once installed on the handle 46 of a syringe, can be installed within a retaining mechanism 34 by inserting the protrusions 58 into corresponding holes (not shown) in the retraction mechanism 58.

By using a snap-fit arrangement, no tools are required for installing the syringes on the 3D printer and only a single plate is required for the retraction mechanism. This can allow faster changing of syringes.

In any embodiment, sensors (not shown) can be provided to determine whether components of the 3D printer have successfully transitioned between expected phases.

As illustrated in FIG. 1*a*, controller C such as a microcontroller, ASIC or computing device can be provided to control operations of the 3D printer. The controller C in this embodiment is communicatively coupled to all motors, actuators and sensors of the 3D printer.

Figure 12:
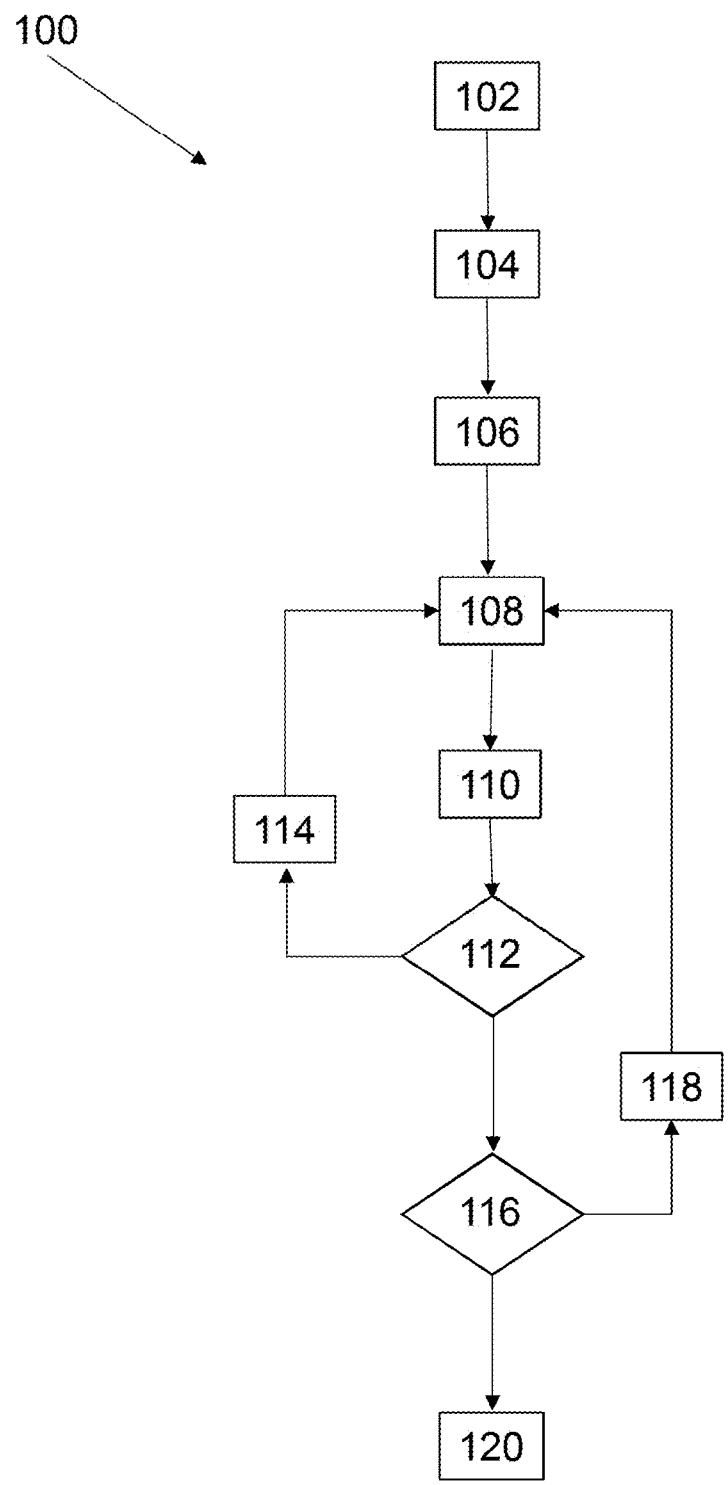
FIG. 12 is a flow chart illustrating a method according to an embodiment of the invention.

The flowchart in FIG. 12 illustrates a method 100 by which the print head 12 may operate.

At step 102, the print head 12 is primed, with the syringes 42 inserted into the block 14 and a print zone PZ situated underneath the syringes 42. This can include the print zone PZ being moved into position along the X-axis and may include an alignment check to ensure that each print location PL is aligned with a nozzle 44 of a particular syringe 42. The support plate 38 can also be installed at this stage.

At step 104 the extrusion plate 34 can be moved downwards, i.e. towards the syringe bodies 44 a small distance. This can ensure that the syringe handles 46 are all in contact with the extrusion plate 34. In the case where snap connections 80 are used, the snap connections 50 may interlock with the retaining mechanism 34 due to the downward movement.

In the case where a snap fit connector 50 is not used, a retaining plate 36 may be inserted at step 106. By moving the extrusion plate 34 downwards before installation of a retaining plate 36, a retaining mechanism having a lower tolerance may be used.

At step 108, material is deposited from the syringes 42 onto the respective print locations PL by continued movement of the extrusion plate 34.

Following each deposition step 108, the syringe handles 46 are each retracted a small distance 110, for example the syringe handles may be retracted a distance between 5 and 10 mm. The distance retracted may correspond to the volume of fluid in the nozzle such that no fluid remains in the nozzle after the retraction.

At step 112, a check is made as to whether every print location PL within the print zone PZ under the syringes 42 has the required materials deposited upon it. If every print location PL has all of the required materials, then the method moves to step 116, otherwise the method moves to step 114.

At step 114, the print zone PZ is rotated so that each print location PL aligns with a different syringe 42 so that a different material can be deposited onto each print location PL. A further deposition step 104 can then take place.

At step 116, it is determined whether every print zone PZ on the print bed has had materials deposited upon it, or whether there are more print zones PZ that require printing. If all print zones PZ have been printed, then the method finishes at step 120. Otherwise, the method moves to step 118.

At step 118, the print bed is moved in the X direction so that a new print zone PZ is aligned with the syringes 42. This may also include an alignment check to ensure that each print location PL is underneath a syringe 42. Subsequently, a further deposition of material occurs at step 108.

At step 120 the method is finished and the printed consumable items can be removed. At this stage a volume of customised esculent products have been produced.

It should be noted that the above-mentioned embodiments illustrate rather than limit the invention, and that those skilled in the art will be capable of designing many alternative embodiments without departing from the scope of the invention as defined by the appended claims. For example, while in the illustrated embodiment the 3D printer 10 is arranged to print a plurality of consumable items such as pharmaceutical or healthcare supplements in parallel, in other embodiments the 3D printer can be arranged to print just a single consumable item during each dispensing cycle.

In a further embodiment, the syringes may have no handles and the plungers may be directly coupled to lead screws or the like, and may thereby be driven more directly by actuators.

The body mechanism may be secured using magnets, optionally electromagnets, as explained above, or may use reversible mechanical securing means such as hinges employing an "over-centre" arrangement to hold the syringe bodies in place, and may also incorporate hydraulic cylinders for actuating the body mechanism.

Figure 13:
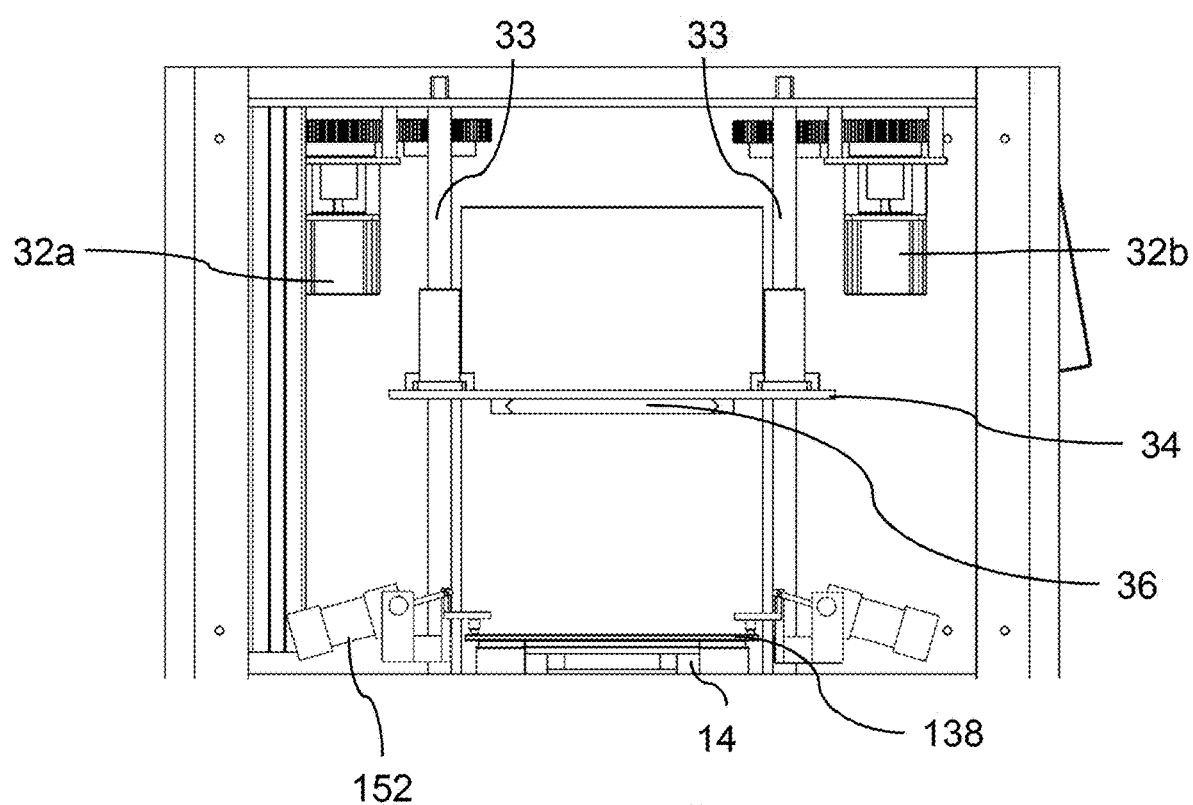
FIG. 13 is a side view diagram showing internal components of the print head of an alternative 3D printer.

FIG. 13 shows a print head having such an alternative body mechanism. The body mechanism of FIG. 13 comprises hydraulic actuators 152 arranged to actuate a mechanism in order to hold a support plate 138 in place. The support plate 138 may thereby hold syringe bodies in place as explained above with reference to FIGS. 4a, 4b, 5 and 6.

The mechanism may be moved by actuation of the hydraulic actuators 152 in an opposite direction so that the support plate 138 may be released and subsequently syringes may be removed from the print head.

Figure 14A:
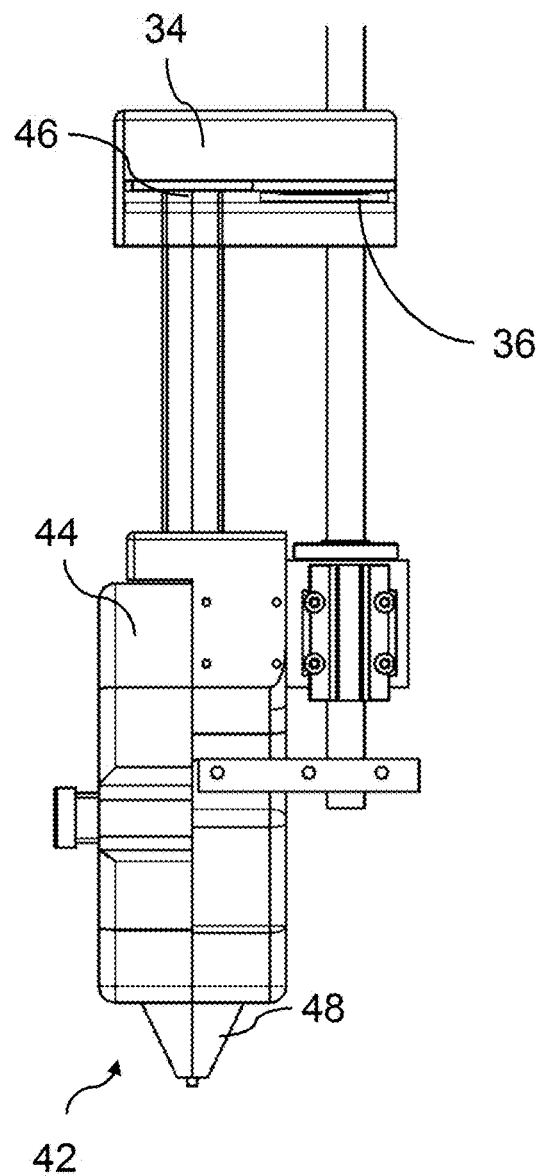
FIGS. 14a and 14b are side and front views of a single syringe fitted within a print head.
Figure 14B:
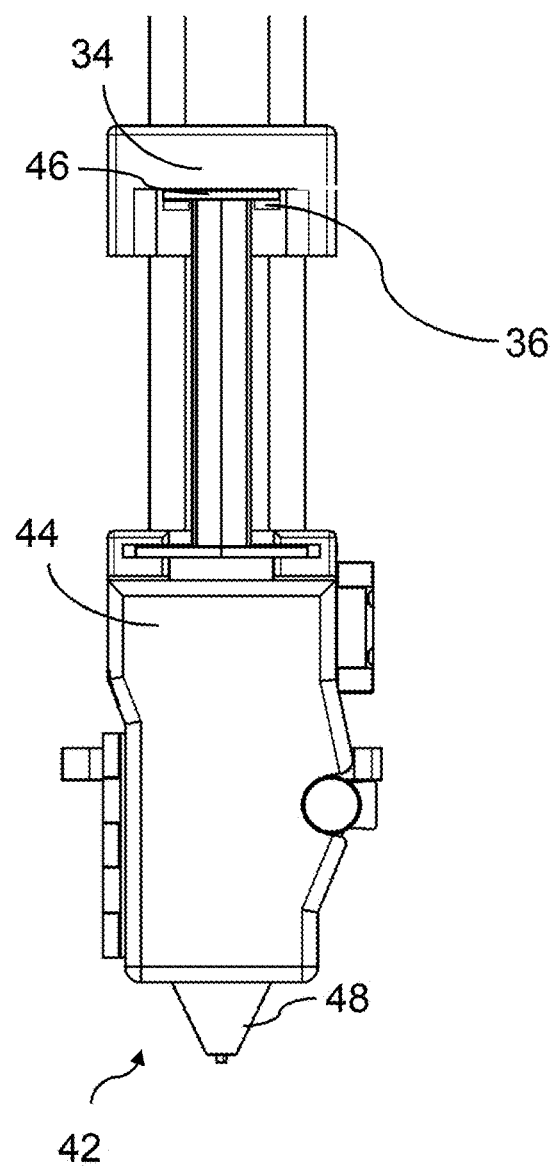

FIGS. 14a and 14b show a single syringe 42 in a print head arranged to receive only a single syringe. The syringe 42 has a body 44 which is held releasably within a body mechanism formed as a case around the syringe body 44 and a nozzle 48 extending from the body 44 and arranged to deposit material from the syringe body 44.

A handle 46 of the syringe 42 is held between an extrusion plate 34 arranged to exert a force on the syringe handle 46 toward the syringe body 44 and a retaining plate 36 arranged to exert a force on the syringe handle 46 away from the syringe body 44. The retaining plate 36 may be slidably coupled to the extrusion plate 34 so that it can be slid into position horizontally in order to retain the syringe handle 46 and may be slid out of position in the reverse direction in order to release the syringe handle 46 and allow the syringe 42 to be removed from the print head.

The invention claimed is:

1. A 3D printer for producing consumable products, the 3D printer comprising an apparatus for dispensing a material, the apparatus comprising:
a first syringe having a body for containing a material, a nozzle for dispensing the material from the body, a plunger for controlling a pressure in the body, and a syringe handle coupled to the plunger and arranged to move the plunger,
a plunger mechanism releasably coupled to the plunger, and
an actuator arranged to move the plunger relative to the body in a first direction to increase a pressure in the syringe body to dispense the material and to move the plunger relative to the body in a second direction to reduce the pressure in the syringe body to inhibit the dispensation of the material,
wherein the plunger mechanism comprises a flat plate arranged to exert a force on the syringe handle in the first direction and a first retaining plate having a slot for receiving and retaining the syringe handle and exerting a force on the syringe handle in the second direction, the first retaining plate is slidably coupled to the flat plate.

2. The 3D printer of claim 1, further comprising a plunger coupling actuator arranged to move the plunger mechanism to couple the plunger mechanism to the plungers.

3. The 3D printer of claim 1, further comprising a body mechanism releasably coupled to the bodies.

4. The 3D printer of claim 3, wherein the body mechanism comprises an electromagnet.

5. The 3D printer of claim 1, wherein the plunger mechanism comprises a snap fit coupling.

6. The 3D printer of claim 1, wherein the plunger mechanism comprises a lead screw.

7. The 3D printer of claim 1, further comprising a second syringe having a body for containing a second material, a nozzle for dispensing the second material and a plunger for controlling a pressure on the second material in the body,
wherein the plunger mechanism is coupled to the plunger of the second syringe and the body mechanism is coupled to the body of the second syringe such that the pressure in the second syringe body varies with the pressure in the first syringe body.

8. The 3D printer of claim 7, wherein the first and the second syringes each comprises a handle, and
wherein the plunger mechanism comprises at least two retaining plates, each retaining plate having a slot for receiving and retaining one of the syringe handles.

9. The 3D printer of claim 7, wherein the first and the second syringes are arranged to dispense materials onto a first and a second print location respectively.

10. The 3D printer of claim 1, further comprising a third syringe having a body for containing a third material, a nozzle for dispensing the third material and a plunger for controlling a pressure on the third material in the body,
wherein the plunger mechanism is coupled to the plunger of the third syringe such that the plunger of the third syringe moves with the plunger of the first syringe.

11. The 3D printer of claim 10, wherein the first, second and third syringes each comprises a handle, and
wherein the plunger mechanism comprises at least two retaining plate including a first retaining plate having two slots, one slot for receiving and retaining each of the syringe handles.

12. The 3D printer of claim 1, further comprising a plate containing a first print location for receiving and supporting material distributed from the first syringe, wherein the plate is rotatable relative to the syringe.

13. The 3D printer of claim 12, wherein the plate is rotatable so that the first syringe can align with the second print location at a point in time and the second syringe may align with the first print location at a point in time.

14. A method for depositing material using a 3D printer, comprising:
releasably coupling a syringe to the 3D printer, the syringe having a body for containing material, a nozzle for dispensing the material and a plunger for controlling a pressure in the body,
depositing the material from the syringe nozzle onto a first print location by moving the plunger of the syringe with a plunger mechanism in a first direction to increase a pressure in the syringe body,
moving, by an actuator, the plunger of the syringe in a second direction opposite to the first direction with the plunger mechanism in order to reduce the pressure in the syringe body and to inhibit deposition of the material, wherein the syringe further comprises a handle coupled to the plunger, and wherein the method further comprises installing the syringe in a retaining mechanism by carrying out the following steps in order:
  applying a force to the syringe handle using a first plate of a retaining mechanism on a first side of the syringe handle; and
  installing a second plate of the retaining mechanism on a second side of the syringe handle opposite to the first side, having a slot for receiving and retaining the syringe handle,
  wherein the first plate is slidably coupled to the second plate.

15. The method of claim 14, wherein the syringe is a first syringe, and
  wherein the method further comprises:
    providing a second syringe having a body for containing a second material, a nozzle for dispensing fluid and a plunger for controlling a pressure in the body,
    depositing a material from the second syringe nozzle onto a second print location by moving the plunger of the second syringe with the retaining mechanism in the first direction to increase a pressure in the syringe body at the same time as the movement of the first syringe handle, and
    moving the plunger of the second syringe in a direction opposite to the first direction in order to reduce the pressure in the second syringe body and to inhibit deposition of the material.

16. The method of claim 14, further comprising depositing material from the first syringe nozzle onto the second print location by moving the plunger of the first syringe in the first direction to generate a positive pressure in the syringe body.

17. The method of claim 14, further comprising moving the first and/or the second print location by rotation of a plate containing the first print location.

* * * * *